US011971953B2

(12) United States Patent
Atanasoaei et al.

(10) Patent No.: US 11,971,953 B2
(45) Date of Patent: Apr. 30, 2024

(54) MACHINE ANNOTATION OF PHOTOGRAPHIC IMAGES

(71) Applicant: INAIT SA, Lausanne (CH)

(72) Inventors: Constantin Cosmin Atanasoaei, Chavannes-pres-Renens (CH); Daniel Milan Lütgehetmann, Lausanne (CH); Dimitri Zaganidis, Granges (CH); John Rahmon, Lausanne (CH); Michele De Gruttola, Geneva (CH)

(73) Assignee: INAIT SA, Lausanne (CH)

( * ) Notice: Subject to any disclaimer, the term of this patent is extended or adjusted under 35 U.S.C. 154(b) by 294 days.

(21) Appl. No.: 17/180,089

(22) Filed: Feb. 19, 2021

(65) Prior Publication Data
US 2022/0245398 A1 Aug. 4, 2022

(30) Foreign Application Priority Data

Feb. 2, 2021 (GR) .............. 20210100069

(51) Int. Cl.
*G06F 18/214* (2023.01)
*G06F 18/22* (2023.01)
(Continued)

(52) U.S. Cl.
CPC ............ *G06F 18/214* (2023.01); *G06F 18/22* (2023.01); *G06T 7/70* (2017.01); *G06T 17/00* (2013.01);
(Continued)

(58) Field of Classification Search
CPC ......... G06F 18/214; G06F 18/22; G06T 7/70; G06T 17/00; G06T 19/20;
(Continued)

(56) References Cited

U.S. PATENT DOCUMENTS 6,246,954 B1 6/2001 Berstis et al.
6,826,301 B2 11/2004 Glickman
(Continued)

FOREIGN PATENT DOCUMENTS

CN 1658559 8/2005
CN 102376071 3/2012
(Continued)

OTHER PUBLICATIONS

Rodrigues et al., "Confidence factor and feature selection for semi-supervised multi-label classification methods," Presented at 2014 International Joint Conference on Neural Networks (IJCNN), Beijing, 2014, 864-871.

(Continued)

*Primary Examiner* — Christopher M Brandt
(74) *Attorney, Agent, or Firm* — Fish & Richardson P.C.

(57) ABSTRACT

Methods, systems, and apparatus, including computer programs encoded on a computer storage medium, for image processing that involves annotating landmarks on real two-dimensional images. In one aspect, the methods include generating a training set of images of an object for landmark detection. This includes receiving a collection of real images of an object, estimating a pose of the object in each real image in a proper subset of the collection of real images, creating a collection of surrogate images of the object for the training set using the estimated poses and a three-dimensional model of the object.

22 Claims, 4 Drawing Sheets

(51) Int. Cl.
*G06T 7/70* (2017.01)
*G06T 17/00* (2006.01)
*G06T 19/20* (2011.01)

(52) U.S. Cl.
CPC .... *G06T 19/20* (2013.01); *G06T 2207/20081* (2013.01); *G06T 2219/004* (2013.01); *G06T 2219/2008* (2013.01); *G06T 2219/2012* (2013.01)

(58) Field of Classification Search
CPC ..... G06T 2207/20081; G06T 2219/004; G06T 2219/2008; G06T 2219/2012; G06T 2207/30164; G06T 7/73; G06T 2219/2024; G06T 15/20; G06V 10/774; G06V 20/70
See application file for complete search history.

(56) References Cited

U.S. PATENT DOCUMENTS

| | | |
|---|---|---|
| 6,969,809 B2 | 11/2005 | Rainey |
| 7,889,931 B2 | 2/2011 | Webb et al. |
| 8,515,152 B2 | 8/2013 | Siri |
| 8,712,893 B1 | 4/2014 | Brandmaier et al. |
| 9,262,789 B1 | 2/2016 | Tofte |
| 9,307,234 B1 | 4/2016 | Greiner et al. |
| 9,489,696 B1 | 11/2016 | Tofte |
| 9,870,609 B2 | 1/2018 | Kompalli et al. |
| 9,886,771 B1 | 2/2018 | Chen et al. |
| 10,580,075 B1 | 3/2020 | Brandmaier et al. |
| 10,657,707 B1 | 5/2020 | Leise |
| 10,789,786 B2 | 9/2020 | Zhang et al. |
| 2002/0007289 A1 | 1/2002 | Malin et al. |
| 2004/0113783 A1 | 6/2004 | Yagesh |
| 2004/0183673 A1 | 9/2004 | Nageli |
| 2005/0108065 A1 | 5/2005 | Dorfstatter |
| 2006/0103568 A1 | 5/2006 | Powell et al. |
| 2006/0114531 A1 | 6/2006 | Webb et al. |
| 2006/0124377 A1 | 6/2006 | Lichtinger et al. |
| 2006/0267799 A1 | 11/2006 | Mendelson |
| 2007/0164862 A1 | 7/2007 | Dhanjal et al. |
| 2008/0255887 A1 | 10/2008 | Gruter |
| 2008/0267487 A1 | 10/2008 | Siri |
| 2008/0281658 A1 | 11/2008 | Siessman |
| 2009/0033540 A1 | 2/2009 | Breed et al. |
| 2009/0256736 A1 | 10/2009 | Orr |
| 2010/0067420 A1 | 3/2010 | Twitchell, Jr. |
| 2010/0073194 A1 | 3/2010 | Ghazarian |
| 2010/0100319 A1 | 4/2010 | Trinko et al. |
| 2010/0106413 A1 | 4/2010 | Mudalige |
| 2010/0265104 A1 | 10/2010 | Zlojutro |
| 2010/0265325 A1 | 10/2010 | Lo et al. |
| 2010/0271196 A1 | 10/2010 | Schmitt et al. |
| 2011/0068954 A1 | 3/2011 | McQuade et al. |
| 2011/0102232 A1 | 5/2011 | Orr et al. |
| 2012/0029759 A1 | 2/2012 | Suh et al. |
| 2012/0029764 A1 | 2/2012 | Payne et al. |
| 2012/0062395 A1 | 3/2012 | Sonnabend et al. |
| 2014/0229207 A1 | 8/2014 | Swamy et al. |
| 2014/0309805 A1 | 10/2014 | Ricci |
| 2015/0287130 A1 | 10/2015 | Vercollone et al. |
| 2016/0239922 A1 | 8/2016 | Jimenez |
| 2017/0011294 A1 | 1/2017 | Jagannathan |
| 2017/0293894 A1 | 10/2017 | Taliwal |
| 2018/0040039 A1 | 2/2018 | Wells et al. |
| 2018/0182039 A1 | 6/2018 | Wang et al. |
| 2018/0189949 A1 | 7/2018 | Lapiere et al. |
| 2018/0197048 A1 | 7/2018 | Micks |
| 2018/0260793 A1 | 9/2018 | Li et al. |
| 2018/0293552 A1 | 10/2018 | Zhang et al. |
| 2018/0293664 A1 | 10/2018 | Zhang et al. |
| 2018/0293806 A1 | 10/2018 | Zhang et al. |
| 2018/0300576 A1 | 10/2018 | Dalyac et al. |
| 2019/0213563 A1 | 7/2019 | Zhang et al. |
| 2019/0213689 A1 | 7/2019 | Zhang et al. |
| 2019/0213804 A1 | 7/2019 | Zhang et al. |
| 2022/0058445 A1* | 2/2022 | Li ............................ G06F 18/24 |
| 2022/0084163 A1* | 3/2022 | Lu ............................ G06T 3/40 |

FOREIGN PATENT DOCUMENTS

| | | |
|---|---|---|
| CN | 103310223 | 9/2013 |
| CN | 104268783 | 1/2015 |
| CN | 104517442 | 4/2015 |
| CN | 105488576 | 4/2016 |
| CN | 105488789 | 4/2016 |
| CN | 105678622 | 6/2016 |
| CN | 105719188 | 6/2016 |
| CN | 105956667 | 9/2016 |
| CN | 106021548 | 10/2016 |
| CN | 106022929 | 10/2016 |
| CN | 106056451 | 10/2016 |
| CN | 106127747 | 11/2016 |
| CN | 106203644 | 12/2016 |
| CN | 106250812 | 12/2016 |
| CN | 106296118 | 1/2017 |
| CN | 106296126 | 1/2017 |
| CN | 106370128 | 2/2017 |
| CN | 106372651 | 2/2017 |
| CN | 106504248 | 3/2017 |
| JP | H 0778022 | 3/1995 |
| JP | H0981739 | 3/1997 |
| JP | 2001344463 | 12/2001 |
| JP | 2002183338 | 6/2002 |
| JP | 2003132170 | 5/2003 |
| JP | 2003170817 | 6/2003 |
| JP | 2003196511 | 7/2003 |
| JP | 2003226230 | 8/2003 |
| JP | 2003346021 | 12/2003 |
| JP | 2005107722 | 4/2005 |
| JP | 2006164022 | 6/2006 |
| JP | 3839822 | 11/2006 |
| JP | 2011215973 | 10/2011 |
| JP | 5321784 | 12/2013 |
| JP | 2015184143 | 10/2015 |
| JP | 2017062776 | 3/2017 |
| JP | 2018112999 | 7/2018 |
| JP | 2018537798 | 12/2018 |
| KR | 20160018944 | 2/2016 |
| KR | 20160019514 | 2/2016 |
| KR | 20170016778 | 2/2017 |
| TW | M478859 | 5/2014 |
| WO | WO 2005109263 | 11/2005 |
| WO | WO 2013093932 | 6/2013 |
| WO | WO 2017055878 | 4/2017 |

OTHER PUBLICATIONS

Github.com [online], "Detectron2," Nov. 2020, retrieved on Mar. 5, 2021, retrieved from URL <https://github.com/facebookresearch/detectron2>, 4 pages.

Opencv.org [online], "Camera calibration and 3D reconstructions," Jul. 18, 2020, retrieved from URL <https://docs.opencv.org/4.4.0/d0/d0c/group_calin3d.html#gas549c2075fac14829ff4a58bc931c033d>, 78 pages.

Opencv.org [online], "Pose Estimation," Mar. 15, 2021, retrieved from URL <https://docs.opencv.org/master/d7/d53/tutorial_py_pose.html>, 3 pages.

Ren et al., "Faster R-CNN: Towards real-Time Object Detection With Region Proposal Networks," IEEE Transactions on Pattern Analysis and Machine Intelligence, 2016, 1-14.

Wang, "Structural Damage Monitoring Based on Vibration Modal Analysis and Neural Network Technique," China Master's Theses Full-Text Database Information Technology, Jan. 2004, 1 page (with English abstract).

Wikipedia.org [online], "Harris Corner Detector," Jan. 21, 2021, retrieved on Mar. 5, 2021, retrieved from URL <https://en.wikipedia.org/wiki/Harris_Corner_Detector>, 6 pages.

Wikipedia.org [online], "OPTICS algorithm," Feb. 1, 2021, retrieved on Mar. 5, 2021, retrieved on URL <https://en.wikipedia.org/wiki/OPTICS_algorithm>, 5 pages.

(56) References Cited

OTHER PUBLICATIONS

Wikipedia.org [online], "Scale-invariant feature transform," Feb. 15, 2021, retrieved on Mar. 5, 2021, retrieved on URL <https://en.wikipedia.org/wiki/Scale-invariant_feature_transform>, 16 pages.

Wikipedia.org online , "DBSCAN," Feb. 13, 2021, retrieved on Mar. 5, 2021, retrieved from URL <https://en.wikipedia.org/wiki/DBSCAN>, 8 pages.

Yongming et al., "Research on honeycomb sandwich composite structure damage detection based on matching pursuit method," Chinese Journal of Scientific Instrument, 2012, 1 page (with English abstract).

Deng et al., "Self-supervised 6d object pose estimation for robot manipulation," In2020 IEEE International Conference on Robotics and Automation (ICRA), May 31, 2020 pp. 3665-3671.

Hagelskjaer et al., "Bridging the Performance Gap Between Pose Estimation Networks Trained on Real And Synthetic Data Using Domain Randomization," arXiv e-prints, Nov. 2020:arXiv-2011, 9 pages.

International Search Report and Written Opinion in International Appln. No. PCT/EP2022/051812, dated May 24, 2022, 15 pages.

Pishchulin et al., "Articulated people detection and pose estimation: Reshaping the future," In2012 IEEE Conference on Computer Vision and Pattern Recognition, Jun. 16, 2012, pp. 3178-3185.

International Preliminary Report on Patentability in International Appln. No. PCT/EP2022/051812, mailed on Aug. 17, 2023, 9 pages.

\* cited by examiner

US 11,971,953 B2

MACHINE ANNOTATION OF PHOTOGRAPHIC IMAGES

CROSS REFERENCE TO RELATED APPLICATION

This application claims priority to Greek Application No. 20210100069, filed Feb. 2, 2021, the contents of which are incorporated by reference herein.

BACKGROUND

This specification relates to image processing, more specifically, to image processing that involves annotating landmarks on real two-dimensional images.

Image processing is a type of signal processing in which the processed signal is an image. An input image can be processed, e.g., to produce an output image or a characterization of the image.

In many cases, annotation of an image can facilitate processing of the image, especially in image processing techniques that rely upon machine learning. Annotation can label entities or parts of entities in images with structured information or metadata. The label can indicate, e.g., a class (e.g., cat, dog, arm, leg), a boundary, a corner, a location, or other information. The labels can be used in a variety of contexts, including those that rely upon machine learning and/or artificial intelligence. For example, a collection of annotated images can form a training dataset for pose estimation, image classification, feature extraction, and pattern recognition in contexts as diverse as medical imaging, self-driving vehicles, damage assessment, facial recognition, and agriculture. Currently, machine learning and artificial intelligence models require large datasets that are customized to the particular task performed by the model.

SUMMARY

This specification describes technologies relating to image processing that involves annotating landmarks on two-dimensional images.

In one implementation, the subject matter described in this specification can be embodied in methods performed by data processing apparatus. The methods include generating a training set of images of an object for landmark detection. Generating the training set includes receiving a collection of real images of an object, estimating a pose of the object in each real image in a proper subset of the collection of real images, creating a collection of surrogate images of the object for the training set using the estimated poses and a three-dimensional model of the object. Creating each of the surrogate images in the collection includes rendering the three-dimensional model of the object in two dimensions in a pose that corresponds to a respective of the estimated poses of the object, perturbing another characteristic of the object relative to the object in the real image from which the respective pose of the object was estimated, wherein the perturbation mimics a real-world variation in the object, and labeling landmarks on the surrogate image based on the three-dimensional model.

This and other implementations can include one or more of the following features. The methods can include training a pose estimator using the collection of surrogate images, using the trained pose estimator, estimating the pose of the object in each real image in a second proper subset of the collection of real images, and creating a second collection of surrogate images of the object for the training set using the poses estimated using the pose estimator and the three-dimensional model of the object. The methods can include iteratively training the pose estimator using the second and successive collections of surrogate images and creating a further collection of surrogate images of the object for the training set using the iteratively trained pose estimator. Training the pose estimator can include training the pose estimator using the real images in the proper subset of the collection. Creating the collection of surrogate images can include rendering the three-dimensional model of the object in two dimensions in a pose that corresponds to a first of the estimated poses of the object, comparing the renderings of the object in two dimensions to the object in the real image from which the first estimated pose of the object was estimated, and in response to comparison, designating the first estimated pose as incorrect or unlikely to be correct. Perturbing the other characteristic can include changing a color or texture of the object or a part of the object, or adding a new part to the object, or removing a part of the object, or exchanging an existing part of the object. The method can include labeling landmarks or refining positions of landmarks on the real images in the proper subset based on the three-dimensional model, and including the real images in the proper subset in the training set. The method can include invalidating estimated poses of the object in the real images in the collection based on criteria that reflect real-world conditions in which the real images in the collection are likely to be taken, and excluding the invalidated estimated poses from the proper subset of the collection of real images.

The real images can be of multiple instances of the object. The object can be a make and model year of an automobile. Prior to the estimating of the pose of the object in each real image, the pose of the object in the real images can be unknown.

In another implementation, the subject matter described in this specification can be embodied in methods performed by data processing apparatus. The methods include iteratively: a) estimating, using a machine learning pose estimation model, a pose of an object in a proper subset of a collection of real images of the object, b) generating, using the estimated poses and a three-dimensional model of the object, a collection of surrogate images of the object, wherein the object in the surrogate images of the object is perturbed to mimic a real-world variation in the object, and c) training or retraining the machine learning pose estimation model using the collection of surrogate images of the object. For each iteration other than a first of the iterations, a number of the real images in the proper subset increases relative to a number of the real images in the proper subset in a previous iteration.

This and other implementations can include one or more of the following features. Training or retraining the machine learning pose estimation model can include training or retraining the machine learning pose estimation model using the real images in the proper subset of the collection. The methods can include invalidating estimated poses of the object in the real images in the collection, and excluding the invalidated estimated poses from the proper subset of the collection of real images. The methods can include halting the iterations in response to an increase in the number of the real images in the proper subset of a current iteration relative to the number of the real images in the proper subset in the previous repetition falling below a threshold. The methods can include labeling landmarks on the surrogate image based on the three-dimensional model. The methods can include, for each iteration: labeling landmarks or refining positions of landmarks on the real images in the proper subset based on the three-dimensional model, and training or retraining the machine learning pose estimation model using the real images in the proper subset. The machine learning pose estimation model can identify landmarks to estimate poses. The object in the surrogate images of the object can have a changed color or texture of the object or a part of the object, or an additional new part to the object, or a removed part of the object, or an exchanged part of the object. The real images can be of multiple instances of the object. The object can be a make and model year of an automobile.

Other embodiments of the above-described methods include corresponding systems and apparatus configured to perform the actions of the methods, and computer storage medium encoded with a computer program, the program comprising instructions that when executed by data processing apparatus cause the data processing apparatus to perform the actions of the methods.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
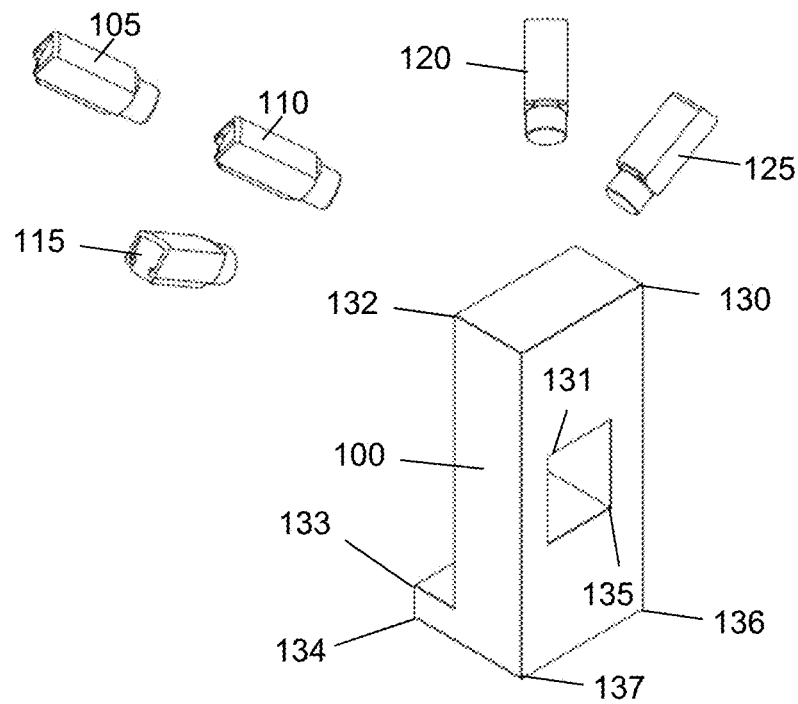
FIG. 1 is a schematic representation of the acquisition of a collection of different images of an object.

FIG. 1 is a schematic representation of the acquisition of a collection of different images of an object 100. For illustrative purposes, object 100 is shown as an assembly of ideal, unmarked geometric parts (e.g., cubes, polyhedrons, parallelepipeds, etc.). However, in real-world applications, objects will generally have a more complicated shape and be textured or otherwise marked, e.g., with ornamental decoration, wear marks, or other markings upon the underlying shape.

A collection of one or more imaging devices (here, illustrated as cameras 105, 110, 115, 120, 125) can be disposed successively or simultaneously at different relative positons around object 100 and oriented at different relative angles with respect to object 100. The positions can be distributed in 3-dimensional space around object 100. The orientations can also vary in 3-dimensions, i.e., the Euler angles (or yaw, pitch, and roll) can all vary. The relative positioning and orientation of a camera 105, 110, 115, 120, 125 with respect to object 100 can be referred to as the relative pose. Since cameras 105, 110, 115, 120, 125 have different relative poses, cameras 105, 110, 115, 120, 125 will each acquire different images of object 100.

Even a simplified object like object 100 includes a number of landmarks 130, 131, 132, 133, 134, 135, 136, . . . . A landmark is a position of interest on object 100. Landmarks can be positioned at geometric locations on an object or at a marking upon the underlying geometric shape. As discussed further below, landmarks can be used for determining the pose of the object. Landmarks can also be used for other types of image processing, e.g., for classifying the object, for extracting features of the object, for locating other structures on the object (geometric structures or markings), for assessing damage to the object, and/or for serving as point of origin from which measurements can be made in these and other image processing techniques.

Figure 2:
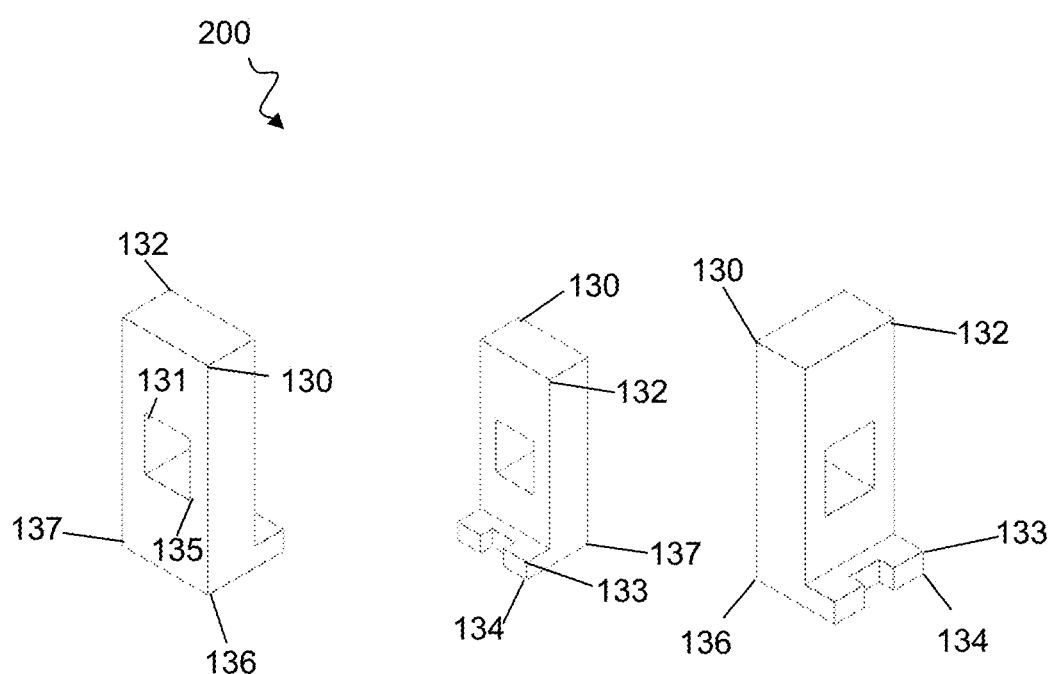
FIG. 2 is a schematic representation of a collection of two-dimensional images acquired by one or more cameras.

FIG. 2 is a schematic representation of a collection 200 of two-dimensional images acquired by one or more cameras, such as cameras 105, 110, 115, 120, 125 (FIG. 1). The images in collection 200 show object 100 at different relative poses. Landmarks like landmarks 130, 131, 132, 133, 134, 135, 136, . . . appear at different locations in different images-if they appear at all. For example, in the leftmost image in collection 200, landmarks 133, 134 are obscured by the remainder of object 100. In contrast, in the rightmost image 210, landmarks 131, 135, 137 are obscured by the remainder of object 100.

Figure 3A:
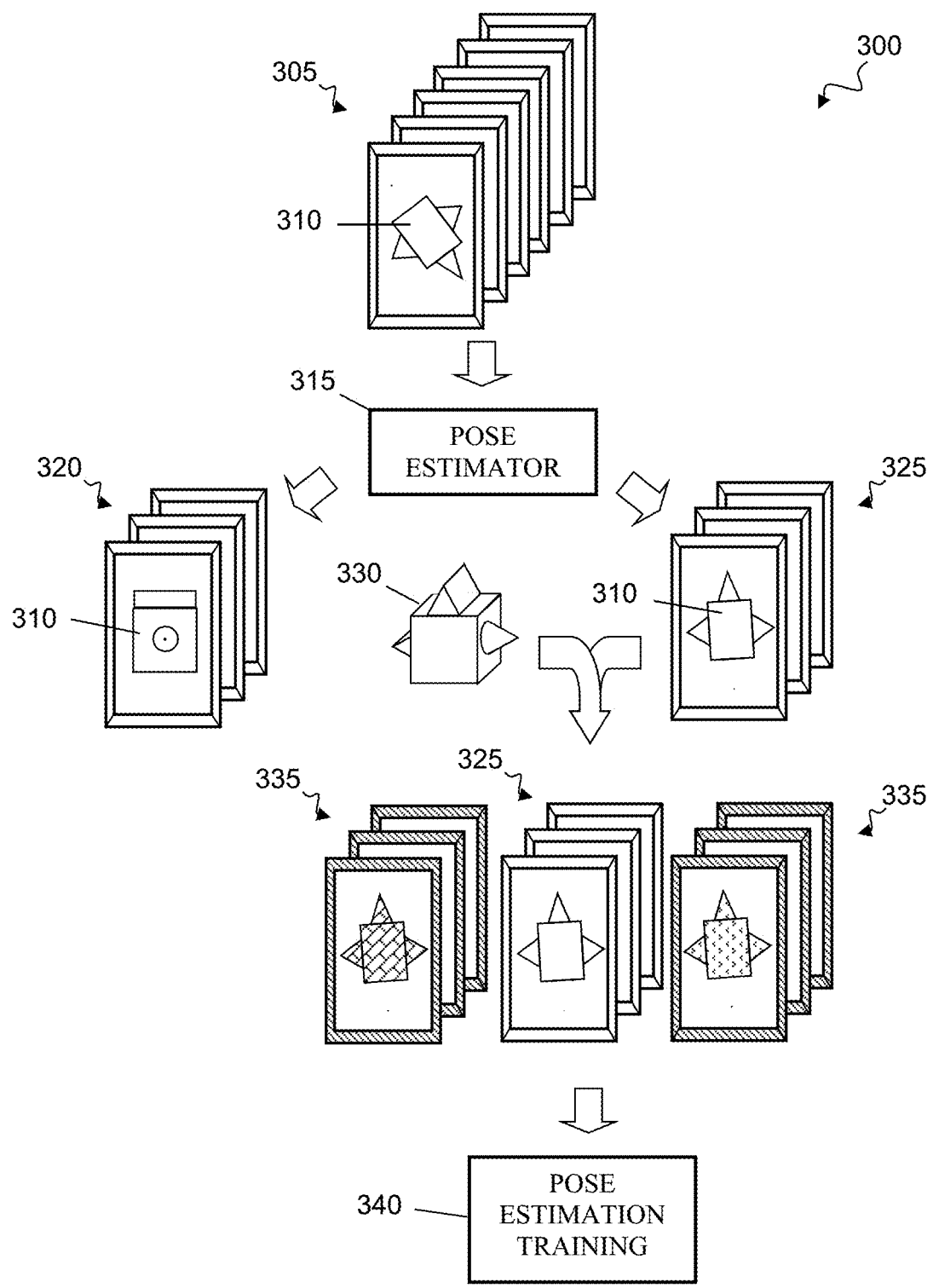
FIGS. 3A, 3B are schematic representations of a process that involves annotating landmarks on real two-dimensional images.
Figure 3B:
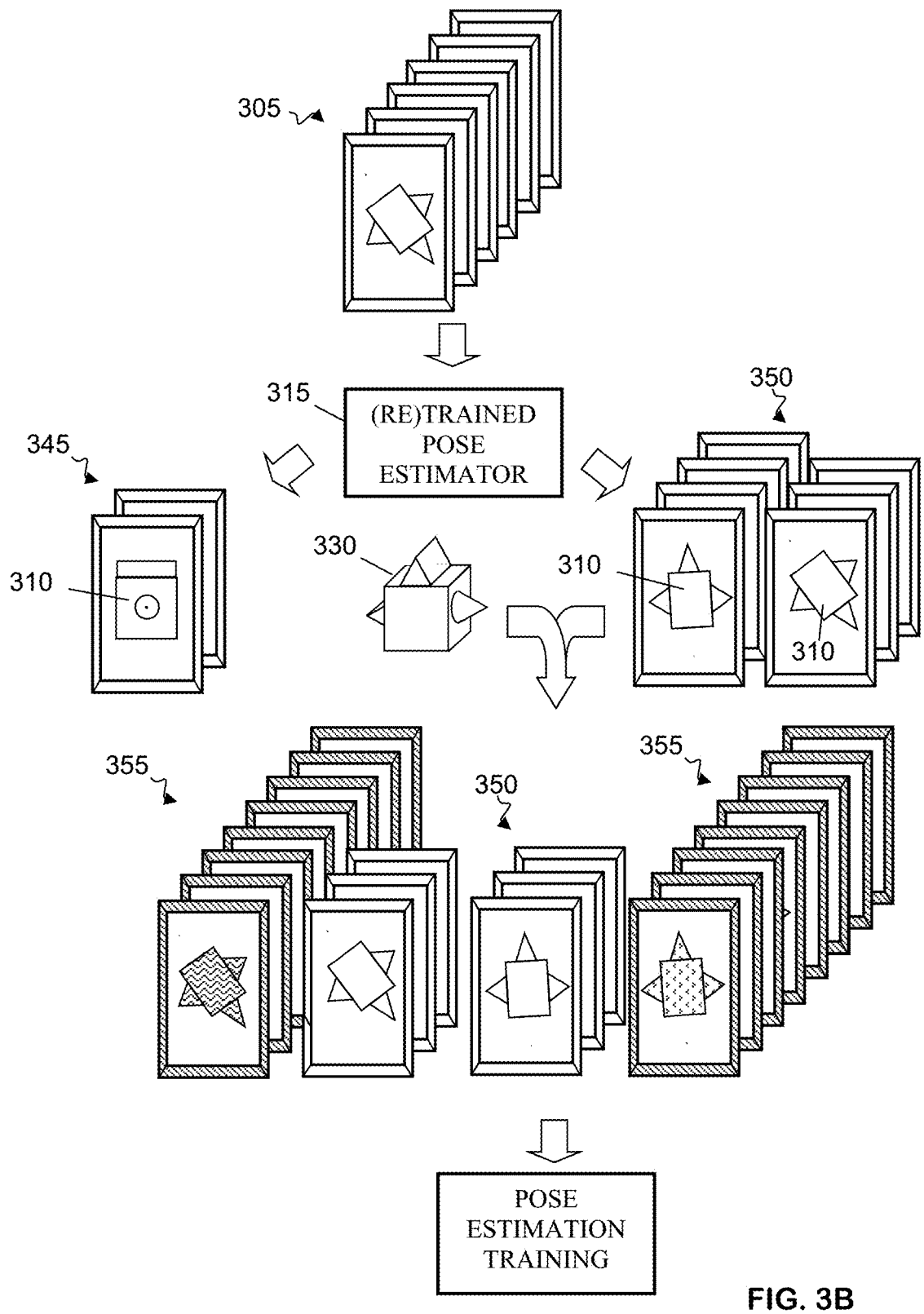

FIGS. 3A, 3B are schematic representations of a process 300 that involves annotating landmarks on real two-dimensional images. Process 300 can be used for a variety of different purposes. For example, process 300 can be used to generate a training set of images with accurately annotated landmarks. As another example, process 300 can be used to train or improve the training of a machine learning model for landmark detection and/or pose estimation. As yet another example, process 300 can be used to identify a subset of images in a larger collection that are properly labeled or suitable for a purpose like pose estimation. Conversely, process 300 can be used to identify a subset of images in a larger collection that are improperly labeled or unsuitable for a purpose like pose estimation. In all of these cases, process 300 can be performed by a system of one or more data processing devices that perform data processing activities. The activities of process 300 can be performed in accordance with the logic of a set of machine-readable instructions, a hardware assembly, or a combination of these and/or other instructions.

Starting with FIG. 3A, a collection 305 of unannotated, real two-dimensional images of an object 310 is received by the system that is performing process 300. The real images can be, e.g., digital photographic images or, alternatively, can be formed using X-rays, sound, or other imaging modality. The images can either be in digital or in analog format. For the sake of convenience, only a small number of images are schematically represented in collection 305. In general, collection 305 includes thousands, tens of thousands, or more images.

Although the present specification refers to "an object," all of the images in collection 305 are generally not images of a single physical instance of an object. Rather, the images in collection 305 are generally images of several different instances of different objects that share common visually-identifiable characteristics. Examples include different instances of a make and model of a car or of an appliance, different instances of an animal taxonomic group (e.g., instances of a species or of a gender of a species), and different instances of an organ (e.g., x-ray images of femurs from 100 different humans). As discussed below, in some cases, collection 305 may also include some images that are not of the same object and do not share the common visually-identifiable characteristics. For example, collection 305 may simply be images that are scraped from the Internet, e.g., that are captioned with the name of an identifiable group of instances of an object.

After receipt, the real images in collection 305 are input into a pose estimator 315 that relies upon a two-dimensional landmark detection machine learning model. In particular, pose estimator 315 can identify landmarks on the object in the images and estimate a pose of the object in the image using the identified landmarks. The nature of the landmarks will depend on the nature of the object. For the example discussed below, landmarks can be the corners of different parts of an automobile, including the corners of the windshield, side windows, and grillwork. The pose of the object can be estimated based on the landmarks that are detected, the distance that separates them, and their relative positions in the image. An example machine learning model for landmark detection is the detectron2 available at https://gitbub.com/facebrookresearch/detectron2. An example of a pose estimator that relies upon landmark detection is OpenCV's functionality SolvePNP described at https://docs.opency.org/master/d7/d53/tutorial_py_pose.html.

In general, pose estimator 315 will be unable to estimate the pose of object 310 in a proper subset of the images in collection 305. Further, in some instances, pose predictions made by pose estimator 315 can be reviewed to invalidate poses that do not satisfy certain criteria. The criteria for invalidating a pose prediction can be established based on criteria that reflect real-world conditions in which the images in collection 305 are likely to be taken. The criteria can be tailored according to the nature of the object. For example, for candidate relative poses in which the object is an automobile:

- the camera should be at an altitude of between 0 meters and 5 meter relative to the ground under the automobile,
- the camera should be within 20 m of the automobile,
- the roll of the camera relative to the ground under the automobile is small (e.g., less than +/−10 degrees), and
- the boundary of the automobile should largely match the boundary of the automobile that would result from the predicted pose.

If a pose prediction does not satisfy such criteria, then the pose prediction can be designated as incorrect or unlikely to be correct. In the schematic illustration, image collection 320 includes images for which pose estimator 315 was unable to predict a pose or predicted a pose with too low of a certainty that the pose is correct. In contrast, image collection 325 includes images for which pose estimator 315 was able to predict a pose with a sufficiently high certainty that the pose is correct.

After the images are allocated to respective image collections 320, 325, the system can use the poses predicted for the images in collection 325 and a 3D model 330 of the object to create a collection 335 of surrogate images. The object in each surrogate image in collection 335 has a pose that corresponds to the pose of object 310 in a respective of the images in collection 325. A 3D model such as 3D model 330 represents an object in three-dimensional space, generally divorced from any frame of reference. 3D models can be created manually, algorithmically (e.g., procedural modeling), or by scanning real objects. Surfaces in a 3D model may be defined with texture mapping. Depending on the nature of the 3D model, the 3D model may itself be divided into 3D models of the constituent parts. For example, a 3D model of an automobile generated using computer-aided design (CAD) software may be an assembly of 3D CAD models of the constituent parts.

In some cases, the correspondence between the poses in surrogate images 335 and in collection 325 can be used to identify instances in which pose estimator 315 incorrectly or inaccurately predicted the pose of object 310. For example, the surrogate images created using 3D model 330 and the real images in collection 325 can be compared. For example, a machine learning model can be used to detect the outline of object 310 in the real images. For the surrogate images, the outline of the object can be explicitly computed using computer graphic techniques. The comparison can be used to reject poses where the outline in the surrogate image is visually too different from the outline in the real image. In such cases, the surrogate image can be discarded and the image from collection 325 designated as an image for which pose estimator 315 was unable or unlikely to correctly predict a pose.

3D model 330 can include a number of landmark annotations on the object. As with the landmarks used by pose estimator 315, the nature of the landmarks will depend on the nature of the object. However, since 3D model 330 embodies precise information about the object, 3D model 330 also embodies precise information about the position of the landmarks on the three-dimensional object. When the surrogate images in collection 335 are created using 3D model 330, landmarks in 3D model 330 can be assigned to locations in the surrogate images with perfect knowledge derived from 3D model 330. Further, since the poses of the object in the surrogate images in collection 335 corresponds to the poses in the real images in collection 325, the same knowledge can be used to assign the locations of additional landmarks to the real images in collection 325 or to refine the locations of the landmarks identified by pose estimator 315—again with perfect knowledge derived from the 3D model 330.

The surrogate two-dimensional images in collection 335 can be rendered from the 3D model in a number of ways. For example, ray tracing or other computer graphic techniques can be used. Nevertheless, the surrogate images in collection 335 will differ from the real images in collection 325. In general, the 3D model 330 of the object will be perturbed for rendering the surrogate two-dimensional images in collection 335. Different surrogate two-dimensional images can thus illustrate different variations of the 3D model and improve any training done using collection 335. In general, the perturbations can mimic real-world variations in the objects—or parts of the objects—that are represented by the 3D model 330. For example, in 3D models of automobiles, the colors or texture of the exterior paint and the interior decor can be perturbed. In some cases, parts (e.g., tires, hubcaps, and features like roof carriers) can be added, removed, or exchanged. As another example, in 3D models of organs, physiologically relevant size and relative size variations can be used to perturb the 3D model.

Together, collections 325, 335 of real and surrogate images form a new, fully-annotated image dataset. This new dataset can then be used to train or retrain a landmark predictor—including a landmark predictor in a pose estimator—at 340. In some implementations, the existing landmark predictor in pose estimator 315 is further trained using collections 325, 335. In other implementations, a new landmark predictor is trained from scratch. In either case, the landmark and pose predictions will be improved since collections 325, 335 can represent an accurate training data set that is specific to object 310.

Turning to FIG. 3B, the process can be repeated using the newly trained or retrained pose estimator 315. In particular, the real images in collection 305 can be input into (re)trained pose estimator 315. Once again, (re)trained pose estimator 315 may be unable to estimate the pose of the object 310 in a proper subset of the images in collection 305. However, because pose estimator 315 was (re)trained using collections 325, 335, it is more likely that the pose predictions satisfy criteria for designation as likely to be correct. Thus, the number of images in an image collection 345 that includes images for which (re)trained pose estimator 315 was unable to predict a pose or predicted a pose with too low of a certainty that the pose is correct will be lower than the number of images in image collection 320. Likewise, the number of images in an image collection 350 that includes images for which (re)trained pose estimator 315 able to predict a pose with sufficient certainty will be higher than the number of images in image collection 325.

After the pose predictions by (re)trained pose estimator 315 are allocated to respective image collections 345, 350, the system can use the poses and 3D model 330 to create further surrogate images 355 that correspond to the images in collection 350. If needed, the pose correspondence between the surrogate images 355 and the images in collection 350 can be used to identify instances in which the (re)trained pose estimator 315 incorrectly or inaccurately predicted the pose of object 310 and the relevant image from collection 350 can be redesignated. Landmarks can be assigned or refined in both the surrogate images in collection 355 and the real images in collection 350, again with the perfect knowledge derived from 3D model 330.

As before, collections 350, 355 of real and surrogate images form a new, fully-annotated image dataset that can then be used to train or retrain a landmark predictor— including a landmark predictor in a pose estimator 315. However, the number of images in collections 355, 350 will be larger than the number of images in collections 325, 335. With the larger dataset, landmark prediction will become increasingly more accurate. Further, a number of successive iterations—each using a (re)trained pose estimator—can be performed to iteratively generate annotated image datasets that increase in size.

In some implementations, the process is repeated until the (re)trained pose estimator is able to predict the pose of object 310 in every image in collection 305. In other words, there would be no images for which the (re)trained pose estimator 315 is unable to predict a pose or predicted a pose with too low of a certainty.

In other implementations, the process is repeated until the number of images in collection 305 for which (re)trained pose estimator 315 is able to predict a pose with sufficient certainty does not increase from iteration to iteration or only increases to a small extent. For example, it the number count of images in collection 305 for which (re)trained pose estimator 315 is unable to predict a pose with sufficient certainty may decrease by less than a threshold amount (e.g., less than 1%) in successive iterations, then the training of pose estimator 315 may be considered complete.

This may particularly relevant in instances where collection 305 also includes some images that are not of the same object 310 and/or do not share the common visually-identifiable characteristics. In more detail, as discussed above, collection 305 may generally include thousands or tens of thousands of real images—all purportedly of object 310. It is possible that some of these images may not actually be images of object 310. In such cases, a landmark predictor— and a pose estimator that relies upon such a landmark predictor—may not learn how to predict the pose of the imaged object with certainty. Instead, the predictions will remain uncertain since landmarks will always be displaced from a predicted position to a certain extent. The illustrated process is thus somewhat fault tolerant to incorrect images in collection 305.

More generally, the illustrated process can be used to train a landmark predictor and a pose estimator for object 310 using a large data set that is annotated very accurately. Further, since the process improves both the training dataset and landmark prediction/pose estimation iteratively, without ongoing guidance from human, this can be done relatively quickly and without burdening humans.

Figure 4:
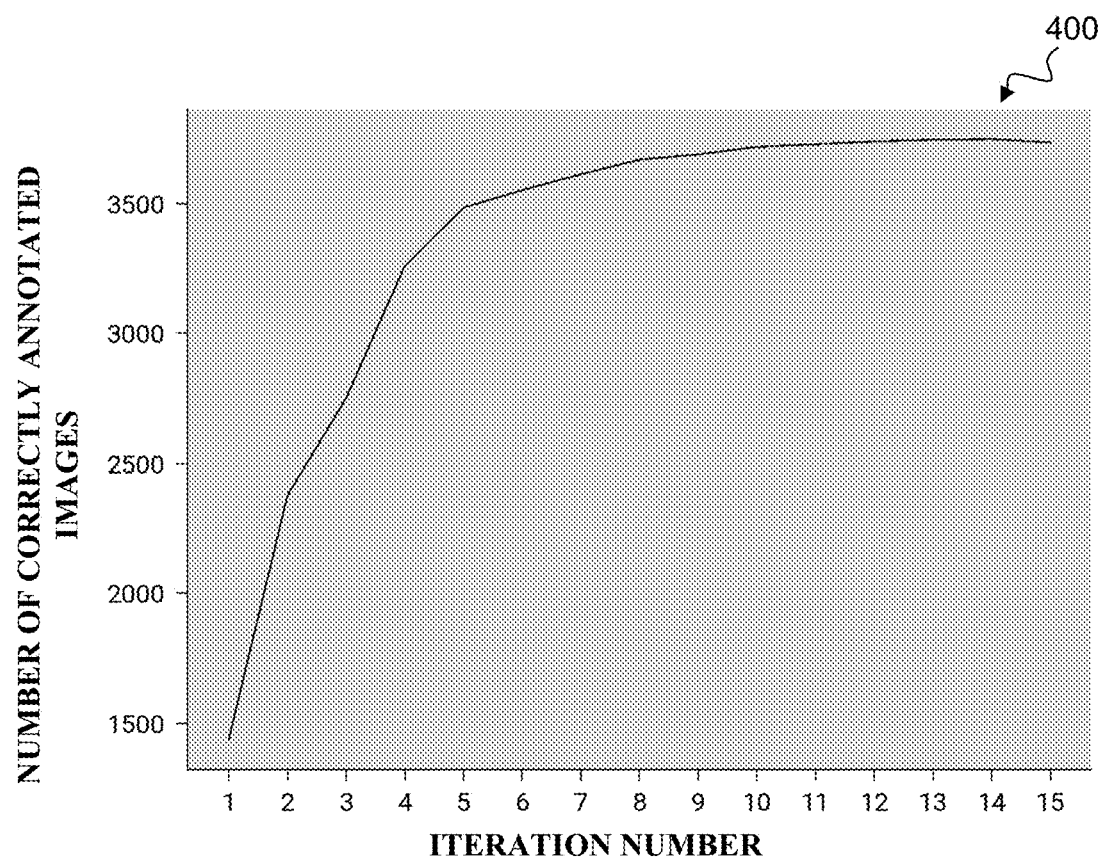
FIG. 4 is a graph that illustrates the iterative improvement in landmark prediction/pose estimation using a process like the process schematic represented in FIGS. 3A, 3B.

FIG. 4 is a graph 400 that illustrates the iterative improvement in landmark prediction/pose estimation using a process like process 300 for annotating real images of a make and year model of an automobile. Position along the x-axis in graph 400 indicates the iteration number. Position along the y-axis in graph 400 indicates the number of correctly annotated real images. In the context of the schematic representation in FIG. 3A, 3B, position along the y-axis in graph 400 indicates the number of real images in collections 325, 350, . . . after the correspondence between the surrogate images and the real images was used to identify instances in which the pose estimator incorrectly or inaccurately predicted the pose of the automobile.

The real images were gathered by scraping the Internet. There were no limits on the images other than they were designated as being images of the relevant make and year model of the car. For example, no limits were placed on the poses and there was no additional guarantee that the make and year model designation was correct.

Notwithstanding the diversity of the input real images, after the first iteration, the pose of the automobile in less than 1500 of more than 5000 images was considered to have been accurately predicted. After the second iteration, the pose about 2350 of more than 5000 images was considered to have been accurately predicted. Further, the number of accurately predicted poses increases with each iteration, asymptotically approaching about 3800 images in which the pose of the automobile was considered to have been accurately predicted.

Upon human review of the images for which the pose estimator was unable to estimate the pose with sufficient certainty, it was seen that most of these images were properly excluded from pose estimation and from a training set for landmark detection or pose estimation. For example, the pose estimator was unable to estimate the pose of an car, e.g., from real images of the interiors of the car, when the make or year model designation was incorrect, when the image itself was of low quality (e.g., low resolution, very poor lighting), or the car was not in an admissible pose (e.g., image from too far away or the image is of the undercarriage of the car).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims.

What is claimed is:

1. A method performed by data processing apparatus, the method comprising generating a training set of images of an object for landmark detection, wherein generating the training set comprises:
receiving a collection of real images of an object;
estimating a pose of the object in each real image in a proper subset of the collection of real images;

creating a collection of surrogate images of the object for the training set using the estimated poses and a three-dimensional model of the object, wherein creating each of the surrogate images in the collection comprises
rendering the three-dimensional model of the object in two dimensions in a pose that is the same as a respective of the estimated poses of the object,
perturbing another characteristic of the object relative to the object in the real image from which the respective pose of the object was estimated, wherein the perturbation mimics a real-world variation in the object, and
labeling landmarks on the surrogate image based on the three-dimensional model.

2. The method of claim 1, further comprising:
training a pose estimator using the collection of surrogate images;
using the trained pose estimator, estimating the pose of the object in each real image in a second proper subset of the collection of real images; and
creating a second collection of surrogate images of the object for the training set using the same poses estimated using the pose estimator and the three-dimensional model of the object.

3. The method of claim 2, further comprising iteratively training the pose estimator using the second and successive collections of surrogate images and creating a further collection of surrogate images of the object for the training set using the iteratively trained pose estimator.

4. The method of claim 1, wherein training the pose estimator further comprises training the pose estimator using the real images in the proper subset of the collection.

5. The method of claim 1, wherein creating the collection of surrogate images further comprises:
rendering the three-dimensional model of the object in two dimensions in a pose that is the same as a first of the estimated poses of the object;
comparing the renderings of the object in two dimensions to the object in the real image from which the first estimated pose of the object was estimated; and
in response to comparison, designating the first estimated pose as incorrect or unlikely to be correct.

6. The method of claim 1, wherein perturbing the other characteristic comprises:
changing a color or texture of the object or a part of the object; or
adding a new part to the object; or
removing a part of the object; or
exchanging an existing part of the object.

7. The method of claim 1, further comprising:
labeling landmarks or refining positions of landmarks on the real images in the proper subset based on the three-dimensional model; and
including the real images in the proper subset in the training set.

8. The method of claim 1, further comprising:
invalidating estimated poses of the object in the real images in the collection based on criteria that reflect real-world conditions in which the real images in the collection are likely to be taken; and
excluding the invalidated estimated poses from the proper subset of the collection of real images.

9. The method of claim 1, wherein the real images are of multiple instances of the object.

10. The method of claim 1, wherein the object is a make and model year of an automobile.

11. The method of claim 1, wherein, prior to the estimating of the pose of the object in each real image, the pose of the object in the real images is unknown.

12. A method performed by data processing apparatus, the method comprising iteratively:
a) estimating, using a machine learning pose estimation model, a pose of an object in a proper subset of a collection of real images of the object,
b) generating, using the estimated poses and a three-dimensional model of the object, a collection of surrogate images of the object, wherein the object in the surrogate images of the object is perturbed to mimic a real-world variation in the object, and
c) training or retraining the machine learning pose estimation model using the collection of surrogate images of the object,
wherein, for each iteration other than a first of the iterations, a number of the real images in the proper subset increases relative to a number of the real images in the proper subset in a previous iteration.

13. The method of claim 12, wherein training or retraining the machine learning pose estimation model further comprises training or retraining the machine learning pose estimation model using the real images in the proper subset of the collection.

14. The method of claim 12, further comprising:
invalidating estimated poses of the object in the real images in the collection; and
excluding the invalidated estimated poses from the proper subset of the collection of real images.

15. The method of claim 12, further comprising:
halting the iterations in response to an increase in the number of the real images in the proper subset of a current iteration relative to the number of the real images in the proper subset in the previous repetition falling below a threshold.

16. The method of claim 12, further comprising:
labeling landmarks on the surrogate image based on the three-dimensional model.

17. The method of claim 12, further comprising, for each iteration:
labeling landmarks or refining positions of landmarks on the real images in the proper subset based on the three-dimensional model; and
training or retraining the machine learning pose estimation model using the real images in the proper subset.

18. The method of claim 12, wherein the machine learning pose estimation model identifies landmarks to estimate poses.

19. The method of claim 12, wherein the object in the surrogate images of the object has:
a changed color or texture of the object or a part of the object; or
an additional new part to the object; or
a removed part of the object; or
an exchanged part of the object.

20. The method of claim 12, wherein the real images are of multiple instances of the object.

21. The method of claim 12, wherein the object is a make and model year of an automobile.

22. The method of claim 12, wherein the collection of surrogate images of the object is generated using the same poses as the estimated poses.

* * * * *